Feb. 4, 1947.  R. D. MUDD  2,415,365
VARIABLE PITCH FLUID DRIVE
Filed Sept. 20, 1944  3 Sheets-Sheet 2
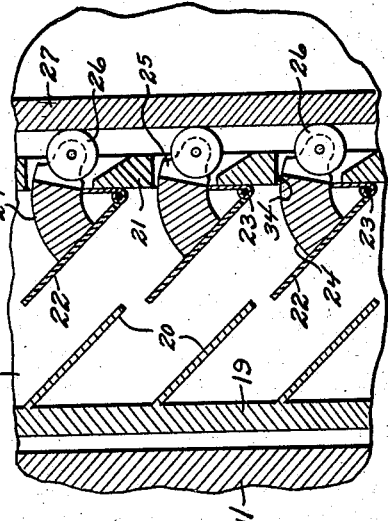
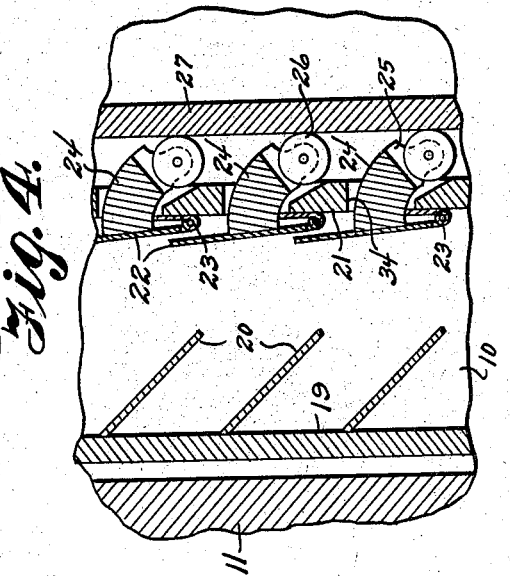
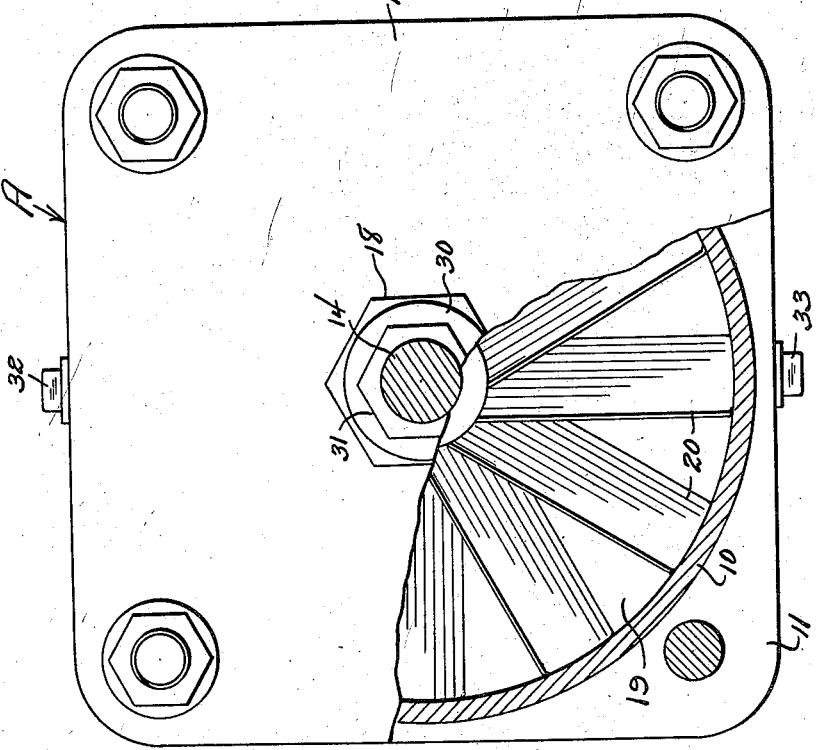
Raymond D. Mudd INVENTOR.
BY
Victor J. Evans & Co.
ATTORNEYS Feb. 4, 1947. R. D. MUDD 2,415,365
VARIABLE PITCH FLUID DRIVE
Filed Sept. 20, 1944   3 Sheets-Sheet 3

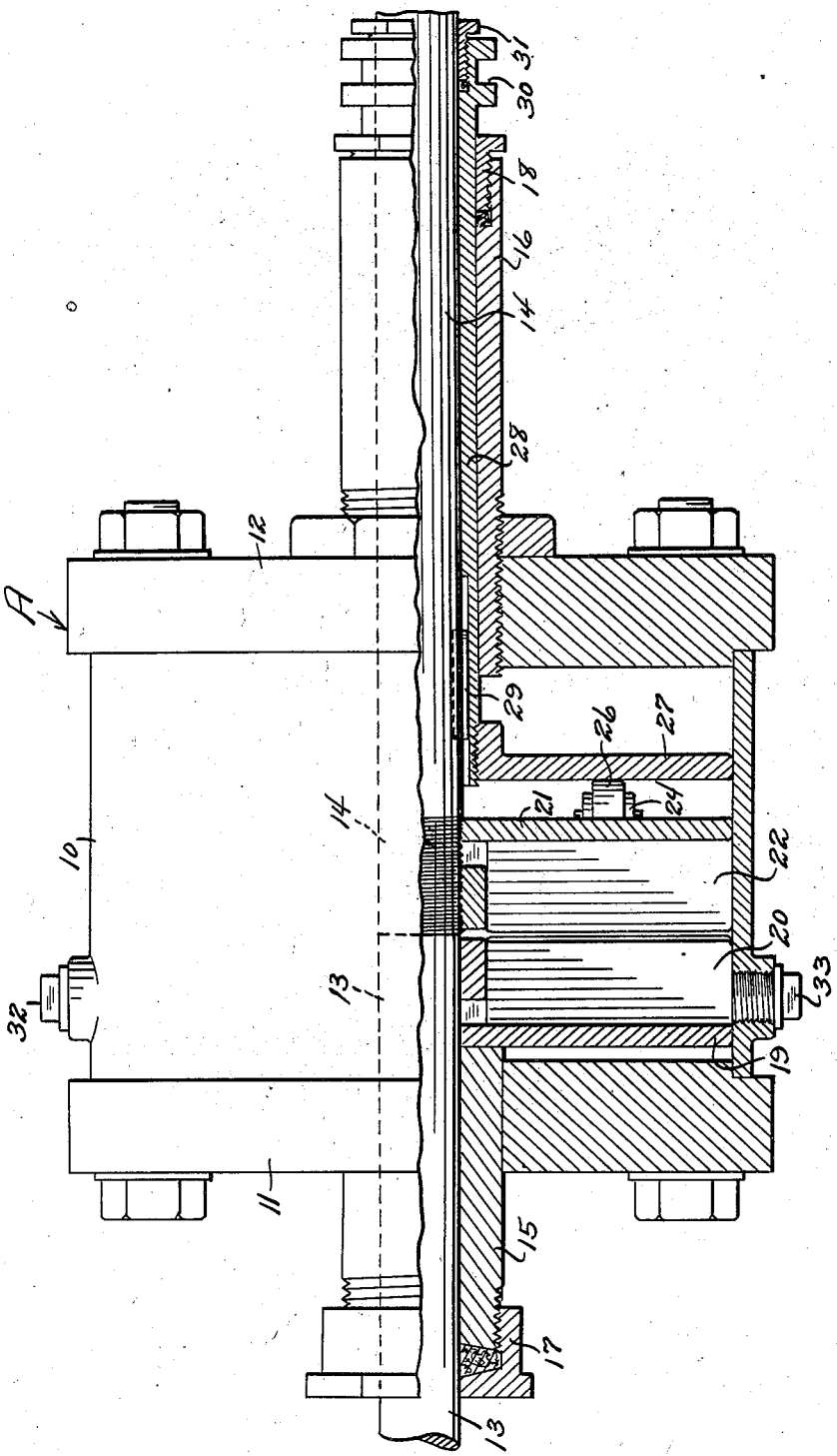

Raymond D. Mudd  INVENTOR.

BY
Victor J. Evans & Co.
ATTORNEYS

Patented Feb. 4, 1947

2,415,365

UNITED STATES PATENT OFFICE 2,415,365

VARIABLE PITCH FLUID DRIVE

Raymond D. Mudd, Electric City, Wash.

Application September 20, 1944, Serial No. 554,959

2 Claims. (Cl. 60—54)

The invention relates to a fluid drive mechanism for power transmission, and more especially to a variable pitch fluid drive device.

The primary object of the invention is the provision of a device of this character, wherein the use of a clutch between driving and driven parts can be entirely dispensed with, and likewise the speed changing transmission mechanism can be eliminated in the employment of such device, the latter being novel in its construction and unique in the assembly of the parts thereof.

Another object of the invention is the provision of a device of this character, wherein the variable pitch blades can be automatically or manually adjusted so as to effect variation in speed transmission.

A further object of the invention is the provision of a device of this character, wherein the variable pitch blades are mounted in a novel manner, so that they will operate in unison and uniformly in the group thereof and within a housing which contains fluid for the coupling of the driving driven elements for the transmission of power from a power unit, the device being adaptable for use in motor vehicles for the operation thereof.

A still further object of the invention is the provision of a device of this character, which is simple in construction, thoroughly reliable and efficient in the working of the same, strong, durable, readily and easily operated, conveniently controlled, positive of action, and inexpensive to manufacture and install.

With these and other objects in view, the invention consists in the features of construction, combination and arrangement of parts as will be hereinafter more fully described, illustrated in the accompanying drawings, which show the preferred embodiment of the invention, and pointed out in the claims hereunto appended.

In the accompanying drawings:

Figure 1 is a side elevation, partly in section of the device constructed in accordance with the invention.

Figure 2 is an end view, partly broken away.

Figure 3 is a fragmentary enlarged sectional view showing the variable pitch blades in one adjusted position, taken on the line 3—3 of Figure 6, looking in the direction of the arrows.

Figure 4 is a similar view showing the blades in another adjusted position.

Similar reference characters indicate corresponding parts throughout the several views in the drawings.

Figure 6:
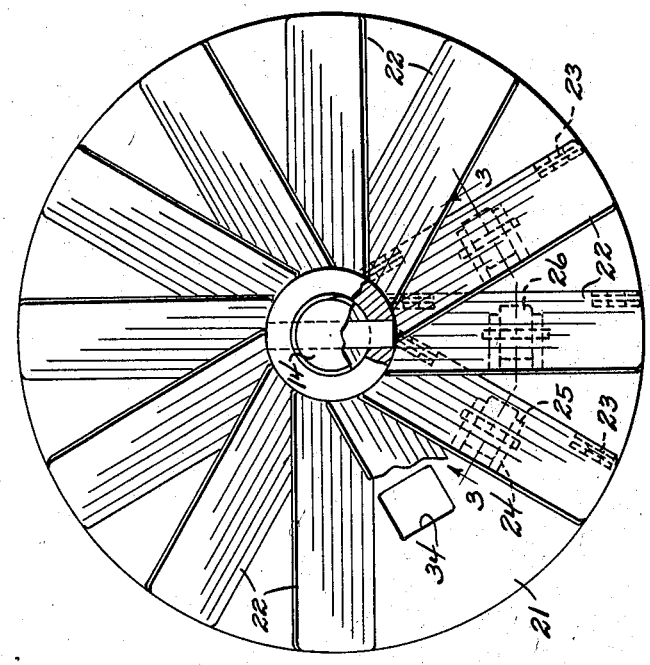
Figure 6 is a view similar to Figure 5 showing the adjustable blades of the device.
Figure 5:
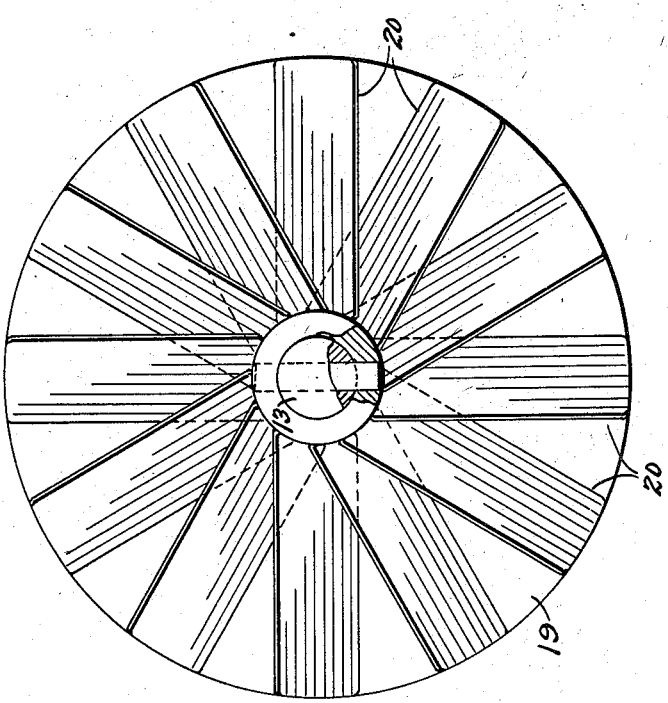
Figure 5 is an elevation of the fixed group of blades of the device.

Referring to the drawings in detail A designates generally the device in its assembly constructed in accordance with the invention, and comprises a cylindrical housing 10 having opposite end heads 11 and 12, respectively, while extended within this housing are the approaching ends 13 and 14 of driving and driven elements, in this instance, being shafts. The driving shaft is powered from a power unit not shown, and is adapted to operate the driven shaft, under their coupling by the driving device, as will be hereinafter more fully described.

Both shaft ends 13 and 14 rotate within sleeve-like bearings, one being denoted at 15 and the other denoted at 16. The bearings are set in the heads 11 and 12, of the housing 10, and at the outer end of the bearing 15 is a packing gland 17, while at the outer end of the bearing 16 is a packing collar 18, to avoid leakage at such points about the movable elements working within the bearings.

Within the housing 10 and fixed to the end of the driving shaft 13 is a disk 19 which carries a group of permanently held radially disposed blades 20, these being angled to the axis of the said driving shaft uniformly to each other. Adjustably threaded on the end of the driven shaft 14 is a disk 21 so that it may be regulated with respect to closeness to the disk 19 under adjustment. Radially arranged on the disk 21 at its face confronting the blades 20 is a group of variable pitch blades 22, which are angularly swingable to the face of the disk 21 on hinges 23 connecting the same thereto, so as to alter the pitch of such blades 22, these being for cooperation with the blades 20, for fluid drive purposes.

The blades 22 on their sides remote from the blades 20 are formed with curved roller brackets 24 having fork ends 25 in which are journaled bearing rollers 26 for engaging an adjustable pitch ranging contact head 27 fitted on a through sleeve 28 splined at 29 for sliding movement on the end of the driven shaft and operating between it and the bearing 16 with its outer controlling end 30 exposed by the latter and automatically or manually actuated in any selected or desirable manner, not shown in detail. The end 30 is provided with a packing collar 31 to prevent leakage therethrough.

The top of the housing 10 is provided with a removable plug 32 so that it can be filled with fluid, such for example as oil, while the bottom of the housing 10 is also provided with a removable plug 33 for the draining of the said housing when desired.

The varying of the pitch of the blades 22 regulates the speed of operation of the driven shaft which has power transmitted thereto from the drive shaft as heretofore stated, which is operated from a power unit not shown.

The brackets 24 play through clearances 34 provided in the disk 21 carrying the blades 22, the fluid pressure on these blades maintaining the rollers 26 in contact with the head 27 in the operation of the fluid drive device A, as should be apparent.

In the use of the device A, a clutch and speed changing mechanism and controls therefor are entirely dispensed with, yet a reverse drive means must be associated with the device, and can be of any desirable construction.

What is claimed is:

1. In a fluid drive, the combination of a stationary housing containing fluid, coaxial driving and driven shafts rotatably mounted in said housing, the ends of said shafts approaching each other inwardly of the housing, a disk secured to each of said shafts, a series of blades angularly fixed to one of said disks, a series of variable pitch blades cooperatively associated with said fixed blades whereby power is transmitted by the fluid between the blades, means movably mounting the variable pitch blades to the other of said disks, brackets secured to and extending from said variable pitch blades, anti-friction means on said brackets, and a mechanism slidably keyed to one of said shafts and contacting said anti-friction means for varying the pitch of said variable pitch blades.

2. In a fluid drive, the combination of a stationary housing containing fluid, coaxial driving and driven shafts rotatably mounted in said housing, the ends of said shafts approaching each other inwardly of the housing, a disk secured to each of said shafts, a series of blades angularly fixed to one of said disks, a series of variable pitch blades cooperatively associated with said fixed blades whereby power is transmitted by the fluid between the blades, means movably mounting the variable pitch blades to the other of said disks, said other of said disks having a series of circumferentially disposed openings, a bracket having one end secured to each of said variable pitch blades and its other end bifurcated, said bracket extending through said openings, rollers journalled in the bifurcated ends of said brackets, means coaxial with the other of said disks and contacting said rollers, and a mechanism slidably keyed to one of said shafts and contacting said rollers for varying the pitch of said variable pitch blades.

RAYMOND D. MUDD.

REFERENCES CITED

The following references are of record in the file of this patent:

UNITED STATES PATENTS

| Number | Name | Date |
|---|---|---|
| 2,032,966 | Yoxall | Mar. 3, 1936 |
| 1,047,948 | Karminski | Dec. 24, 1912 |
| 2,266,085 | Sanderson | Dec. 16, 1941 |
| 2,292,482 | Roche | Aug. 11, 1942 |
| 1,927,040 | Klimek | Sept. 19, 1933 |
| 2,376,462 | Teagno | May 22, 1945 |

FOREIGN PATENTS

| Number | Country | Date |
|---|---|---|
| 518,082 | British | of 1940 |
| 519,968 | British | of 1940 |